United States Patent [19]
Logerot

[11] Patent Number: 5,704,752
[45] Date of Patent: Jan. 6, 1998

[54] ZERO INSERTION FORCE RIVET DEVICE

[75] Inventor: Bernard A. Logerot, Mont Sous Vaudrey, France

[73] Assignee: Amphenol Socapex, Courbevoie, France

[21] Appl. No.: 325,171

[22] PCT Filed: Oct. 20, 1993

[86] PCT No.: PCT/FR93/01030

§ 371 Date: Apr. 19, 1995

§ 102(e) Date: Apr. 19, 1995

[87] PCT Pub. No.: WO94/10464

PCT Pub. Date: May 11, 1994

[30] Foreign Application Priority Data

Oct. 23, 1992 [FR] France ............... 92 12987

[51] Int. Cl.⁶ ............... F16B 19/08; B25G 3/00
[52] U.S. Cl. ............... 411/503; 411/502; 411/21; 411/61; 403/248; 403/279
[58] Field of Search ............... 411/21, 41, 45, 411/46, 48, 69, 59-61, 502, 503; 403/248, 251, 282, 279, 297

[56] References Cited

U.S. PATENT DOCUMENTS

| | | | |
|---|---|---|---|
| 2,340,423 | 1/1944 | O'Shaughnessy, Jr. et al. | 85/40 |
| 2,400,142 | 5/1946 | Tinnerman | 411/61 |
| 2,826,110 | 3/1958 | Lemelson | 85/40 |
| 3,232,161 | 2/1966 | Fernberg | 85/72 |
| 3,269,251 | 8/1966 | Bass | 411/21 |
| 3,710,674 | 1/1973 | Tabor | 411/61 |
| 4,244,661 | 1/1981 | Dervy | 403/279 |
| 4,927,287 | 5/1990 | Ohkawa et al. | 411/21 |
| 5,083,942 | 1/1992 | Hahn | 411/508 |
| 5,259,689 | 11/1993 | Arand et al. | 411/502 |
| 5,261,772 | 11/1993 | Henringer et al. | 411/46 |
| 5,266,052 | 11/1993 | Phillips, II | 411/502 |

FOREIGN PATENT DOCUMENTS

| | | | |
|---|---|---|---|
| 1940299 | 2/1971 | Germany. | |
| 32 12 160 | 10/1983 | Germany | F16B 5/06 |
| 149946 | 6/1921 | United Kingdom | 411/503 |

Primary Examiner—Steven N. Meyers
Assistant Examiner—Tuyet-Phuong Pham
Attorney, Agent, or Firm—Bacon & Thomas

[57] ABSTRACT

The invention relates to a rivet device. The device is characterized in that it comprises a substantially cylindrical tubular body (10), an annular collar extending outwards from the first end of the body, and at least two locking elements (20, 22) formed in the body. Each locking element is constituted by an elastically deformable strip (24) cut out in the body, extending in the direction of the axis of the body, and having a first end secured to the first end of the body and a second end secured to the second end of the body, with each strip having folds (30, 32, 34) in such a manner that in an initial state a portion of the strip projects into the inside of the body and in a deformed state the strip projects to the outside of the body.

10 Claims, 3 Drawing Sheets

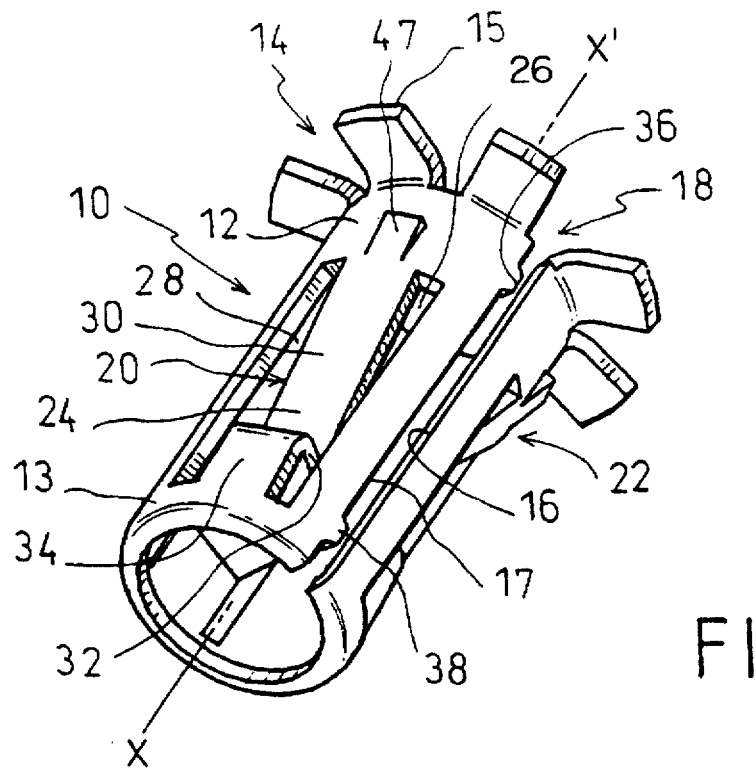
FIG_1
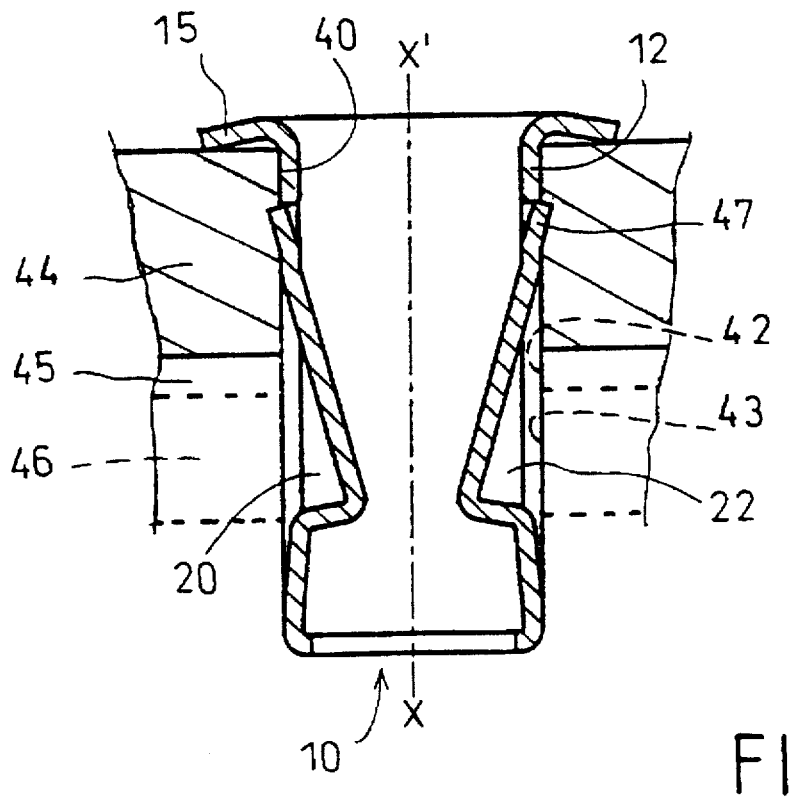
FIG_2

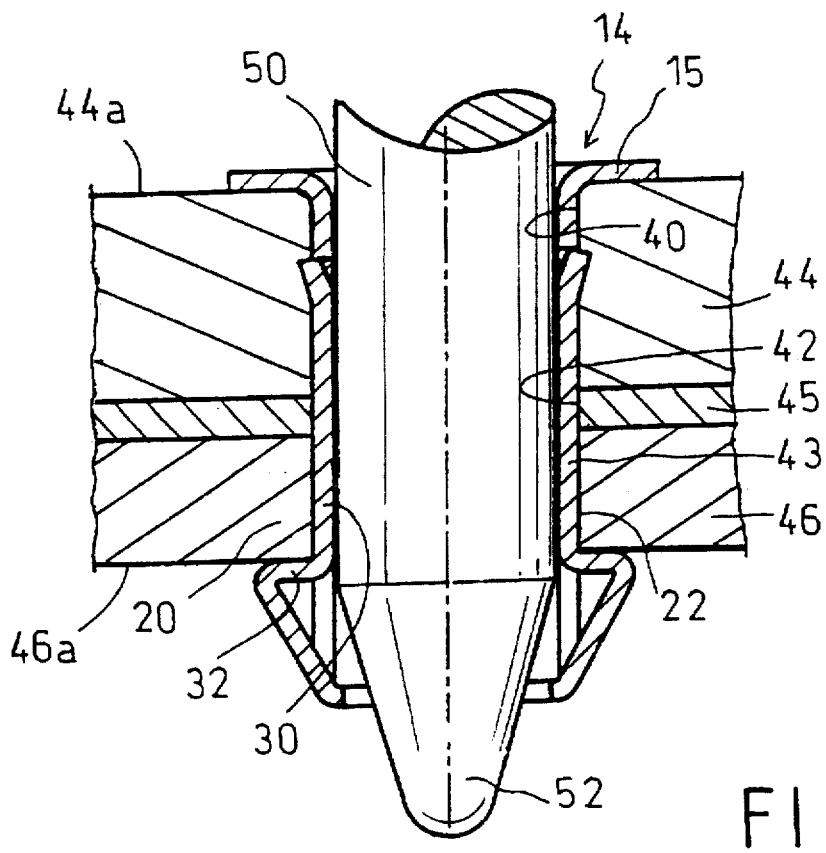
FIG_3
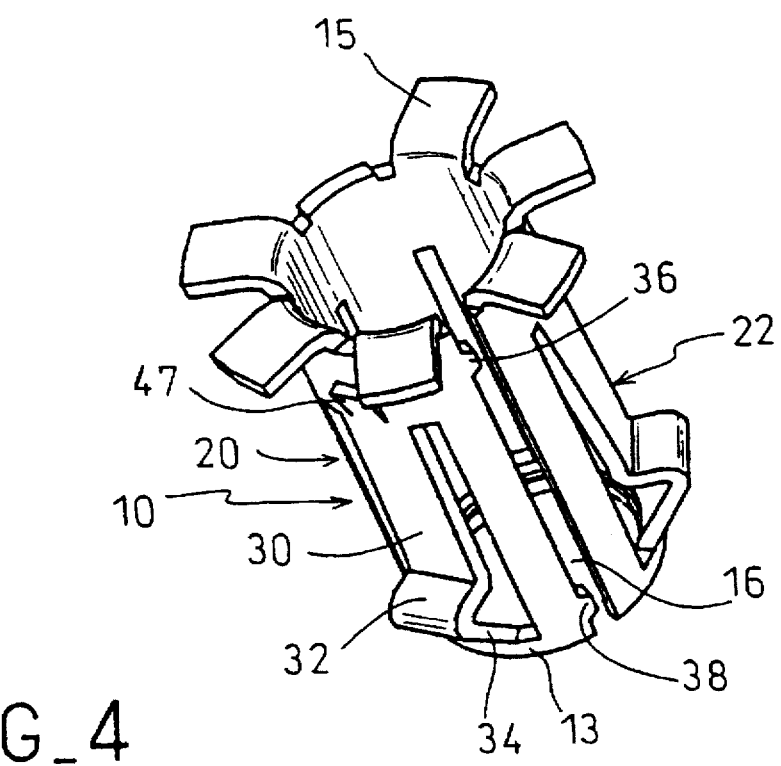
FIG_4

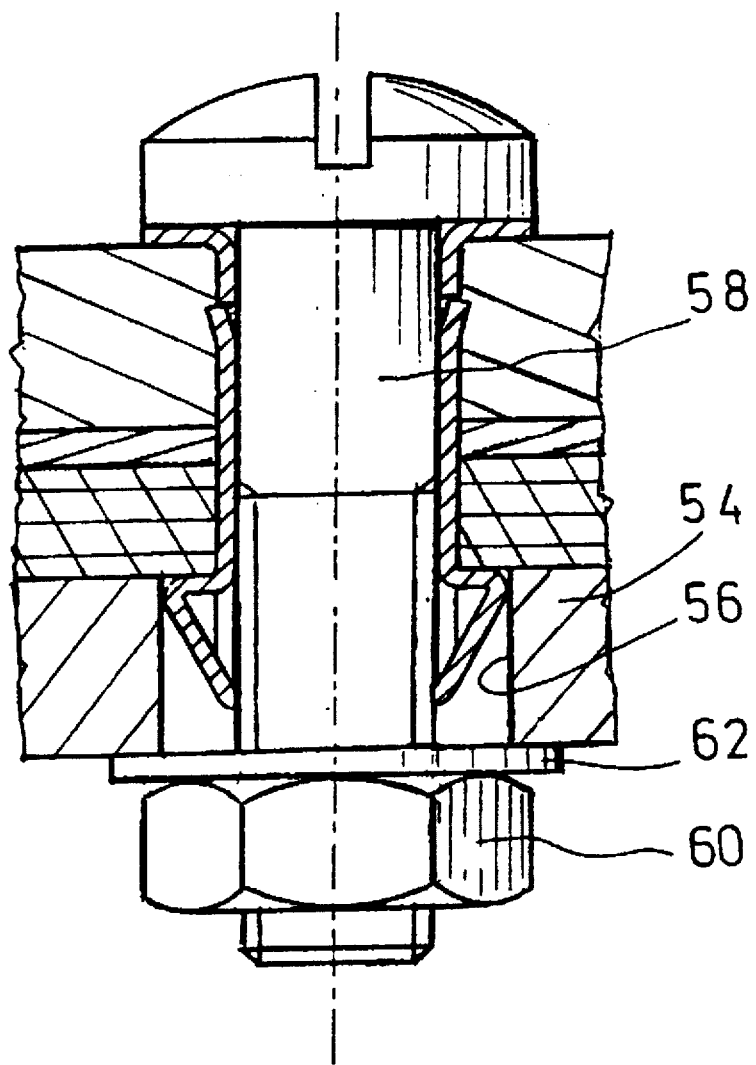
FIG_5

ZERO INSERTION FORCE RIVET DEVICE

BACKGROUND OF THE INVENTION

The present invention relates to a zero insertion force rivet device.

More precisely, the present invention relates to a rivet device for assembling together two or more parts provided with orifices in alignment to enable the parts to be fastened together by means of a rivet without it being necessary to exert significant force to put the rivet into place in the orifices.

In particular, in the field of mounting a surface mount type connector on printed circuit cards, it is necessary to have rivets that ensure adequate centering of the two parts to be assembled together while nevertheless ensuring that the two parts are securely fastened together in the rivet insertion direction.

When mounting a connector of this type on a card, it is common practice to use robots, in which case it is essential to avoid any need to exert significant force to put a connector that is prefitted with two rivets into place on the printed circuit card, since otherwise the robot will engage a safety cutout, i.e. it will stop the assembly operation. In addition, it is necessary for the resulting assembly to be capable of withstanding forces, in particular forces due to plugging and unplugging connection pins, and also forces due to possible mishandling.

SUMMARY OF THE INVENTION

An object of the present invention is to provide a rivet device that enables the parts that are to be assembled to be properly centered, that enables the parts to be clamped effectively against one another, and that requires only very limited force for inserting the rivet into the orifices provided through the parts.

To achieve this object, the rivet device of the invention is characterized in that it comprises:

a substantially tubular body having first and second ends;

an annular collar projecting from said first end outwardly from said body substantially in the plane orthogonal to the axis of said body; and at least two locking elements formed in the body, each locking element being constituted by an elastically deformable strip cut out in said body, extending in the direction of the axis of the body, and having a first end secured to the first end of said body and a second end secured to the second end of said body, each strip having folds such that in an initial state a portion of said strip projects into the inside of said body, and such that in a deformed state said strip projects outside said body, the distance along the axis of said body between said collar and the projecting portions of said strips in the deformed position being substantially equal to the thickness of the set of parts to be assembled together as measured in the direction of the common axis of their orifices.

It will thus be understood that inserting the rivet device requires force that is very limited since the locking elements project into the inside of the rivet body, and not to the outside thereof. However, in a subsequent operation, the locking strips are deformed in such a manner as to cause a portion thereof to project outside the body, forming an interfering catch, thereby preventing the rivet from being extracted.

In a preferred embodiment, the collar is in the form of a truncated cone whose half-angle at the apex is less than 90°, the apex of the truncated cone lying outside said body.

It can thus be seen that during deformation of the locking strips to form the external projections, the collar can be deformed slightly to compensate for tolerances on the design thicknesses, and to ensure that the two parts are properly clamped together in the rivet insertion direction.

In another preferred characteristic, the body and the collar include a slot lying in a half-plane extending from the axis of the body, thereby enabling the diameter of the body to adapt to the diameter of the orifices in the parts. This disposition makes it possible to compensate for possible dispersion in the dimensions of the orifices of the parts to be assembled together and to ensure automatic centering of the two parts relative to the axis of the rivet.

BRIEF DESCRIPTION OF THE DRAWINGS

Other characteristics and advantages of the present invention appear more clearly on reading the following description of an embodiment of the invention given by way of non-limiting example. The description refers to the accompanying drawings, in which:

FIG. 1 is a perspective view of the rivet in its initial state;

FIG. 2 is a vertical section view through a rivet installed in one of the parts for assembly;

FIG. 3 is a vertical section view through a rivet installed in the parts to be assembled together, and after the rivet has been deformed;

FIG. 4 is a view similar to FIG. 1, showing the rivet in its deformed state; and FIG. 5 is a vertical section view through one example of an assembly being fastened together using the rivet on an additional part and making use of the residual empty hole that is left in the rivet after it has been installed.

DETAILED DESCRIPTION OF THE PREFERRED EMBODIMENTS

With reference initially to FIG. 1, a preferred embodiment of the retaining rivet is initially described. The rivet may be made by cutting, folding, and stamping sheet metal having resilient properties, such as a steel or a copper alloy.

The rivet is constituted by a hollow cylindrical body 10 about an axis XX'. At its top end, the rivet is provided with a collar 14 which is connected to the top end 12 of the body 10 and extends outwardly therefrom, lying substantially in a plane perpendicular to the axis XX'. The collar 14 is constituted by a single portion of sheet metal or by a plurality of segments 15, as shown in FIGS. 1 to 4. Preferably, the collar 14 is at a small angle to a plane perpendicular to the axis XX' of the body. More precisely, the collar is preferably constituted by a truncated cone whose half-angle at the apex lies in the range 75° to 90°. As can be seen, the body 10 and the collar 14 are not continuous around their circumference. Each includes a slot, referenced 16 in the body 10 and 18 in the collar 14, the slot lying in a half-plane extending from the axis XX'.

As can also be seen in FIG. 1, the body 10 is provided with locking elements. In the example shown, there are three of them distributed at angular intervals of 120° about the axis XX'. The three locking elements are identical, with only the elements 20 and 22 being visible in FIG. 1. Each locking element is constituted by a strip 24 separated from the remainder of the body by axial cutouts 26 and 28. The ends of the strip 24 are connected to the top and bottom ends 12 and 13 respectively of the cylindrical body 10 of the rivet. In the rest position, the locking elements are constituted by the metal strips 24 which include folds. Each strip 24 comprises a first portion 30 which is inclined relative to the axis XX', a second portion 32 which is substantially orthogonal to the axis XX', and a third portion 34 which is again inclined relative to the axis XX'. Overall, when at rest, each strip 24 projects into the inside of the cylindrical body 10 of the rivet.

The figures show that the edge 17 of the cylindrical body 10 defining the slot 16 is preferably provided with spikes, e.g. two spikes referenced 36 and 38, which project into the slot 16. The function thereof is explained below. To assemble together parts 44, 45, and 46 provided with respective orifices 40, 42, and 43, the cylindrical body includes tongues 47 projecting out from the cylindrical body in its top end 12 adjacent to the collar 14.

In one embodiment, the sheet metal used for making the rivet has a thickness of 0.25 mm and the width of the slot 16 is about 0.35 mm. The other dimensions of the rivet depend on the thicknesses of the parts to be assembled together and on the diameter of the assembly orifices therein.

FIG. 2 shows a first use of the rivet.

In a first stage, the rivet is inserted firstly into the orifice 40 of the first part 44 to be fastened. Because of the projecting non-return tongues 47, the rivet is secured to the part 44. During such insertion, differences due to manufacturing tolerances are accommodated by crushing the spikes 36 and 38. This ensures that the rivet is automatically clamped and automatically centered in the orifices.

During a second stage, the rivet as already secured to the part 44 is inserted into the orifices 42 and 43 of the parts 45 and 46 by means of a robot or by hand. Since the locking elements 20 and 22 are inside the cylindrical body, such insertion can take place using a force that is close to zero.

In a third stage, a finger 50 is inserted inside the cylindrical body 10 by means of a manipulator, thereby opening out the locking elements 20, 22 of the rivet. The chamfered end 52 of the finger acts on the first portions 30 of the locking elements. The effect of pushing in the finger 50 is to cause the portion 30 to be deformed as shown in FIGS. 3 and 4 so as to become substantially axial. The second portion 32 then projects outside the cylindrical body and bears against the bottom face 46a of the part 46, thereby locking the rivet in the orifices 40, 41, and 42. Manufacturing tolerances in the thicknesses of the parts 44, 45, and 46 are accommodated by small amounts of deformation in the collar 14 which is pressed against the top face 44a of the part 44.

In a variant, the rivet can be inserted directly into all three orifices 40, 42, and 43 of the parts 44, 45, and 46. To enable insertion with zero insertion force, it is necessary for the orifice 40 of the top part 44 to have a diameter that is slightly larger, given the presence of the projections 47. Thereafter, the locking elements are deformed as described above with reference to FIG. 3. In this second method of rivet insertion, it is also possible to make use of a rivet that does not have anti-return projecting tongues 47.

The rivet may be made of a material that conducts electricity. Under such circumstances, it serves not only to obtain mechanical fastening between the parts to be assembled together, but also to obtain an electrical connection therebetween.

Furthermore, the rivet may be made of a conductive metal sheet that is suitable for soldering, e.g. using a lead-tin alloy, thereby reinforcing the electrical continuity provided by the rivet made of a conductive material and also making disassembly of the assembled-together parts practically impossible once soldering has taken place.

FIG. 5 shows an improved embodiment of the rivet device enabling parts that have already been assembled together by means of the rivet of FIGS. 2 and 3 to be fixed as a unit on an additional part 54, e.g. a metal plate, which additional part likewise has an orifice 56. To this end, the rivet device includes, in addition to the rivet proper, a standard screw 58 or a standard rivet, or any other equivalent mechanical fastener means which is engaged in the inside cylindrical orifice that remains inside the body 10 of the rivet. This orifice is completely empty because the locking elements 20, 22 are caused to project outside the cylindrical body after the finger 50 has passed through the rivet. It is necessary for the diameter of the orifice 56 to be large enough to receive the deformed locking elements. A nut 60 and a washer 62 co-operate with the screw 58 so as to achieve mechanical fastening between the part 54 and the set of parts 44, 45, and 46 that have already been assembled together by means of the rivet.

What I claim is:

1. A rivet device for fastening a set of parts which, when assembled together, include orifices having a common axis, and which present a total given thickness, said rivet device comprising:

a member formed by a substantially tubular body having first and second ends;

an annular collar projecting from said first end outwardly from said body substantially in a plane orthogonal to an axis of said body; and at least two locking elements formed in the body, each locking element being constituted by an elastically deformable strip cut out in said body and separated from said body by two cuts, said locking elements extending in a direction of the axis of the body, and having a first end secured to the first end of said body and a second end secured to the second end of said body, each strip having folds having two stable states, said folds being formed such that in an initial state said strip entirely projects into an inside of said body, and such that in a deformed state said strip is capable of projecting outside said body, a distance along the axis of said body between said collar and the projecting portions of said strips in the deformed position being substantially equal to the thickness of the set of parts to be assembled together as measured in a direction of the common axis of their orifices.

2. A rivet device according to claim 1, wherein said collar forms a truncated cone, with a semi-angle at an apex lying in a range of 75° to 90°, the apex of said truncated cone being outside said body.

3. A rivet device according to claim 1, wherein said body and said collar include a slot lying in a half-plane extending from the axis of said body, thereby enabling a diameter of said body to adapt to a diameter of said orifices.

4. A rivet device according to claim 3, wherein one of two edges of the slot formed in said body is provided with at least one deformable extension of a length that is shorter than the width of said slot in a plane orthogonal to the axis of said body.

5. A rivet device according to claim 1, wherein each locking element forming strip comprises, in its nondeformed state, a first folded portion at an angle with the axis of said body and extending from said first end of the strip, a second folded portion substantially orthogonal to the axis of said body, and a third folded portion connecting said second folded portion to said second end of the strip, and in its deformed state, said second and third folded portions project out from said cylindrical body, said second portion being substantially orthogonal to the axis of said body, whereby said parts to be fastened are clamped between said collar and said second folded portions.

6. A rivet device according to claim 1, wherein said body, said collar, and said strips, form a single part cut out from and folded in a single metal sheet having resilient properties.

7. A rivet device according to claim 1, wherein one of said first and second ends of the body which is closer to said collar includes elements projecting out from said body to enable the body to be secured in one of the parts to be assembled together.

8. A rivet device according to claim 1, made from a sheet of electrically conductive metal so as to ensure electrical continuity between the parts to be assembled together.

9. A rivet device according claim 1, made from a material that is suitable for soldering.

10. A rivet device according to claim 1, further including mechanical fastening means engagable in a cylindrical orifice of the cylindrical body to secure parts that have already been assembled together by the rivet body to an additional part.

* * * * *